(12) United States Patent
Walker

(10) Patent No.: US 10,604,265 B2
(45) Date of Patent: Mar. 31, 2020

(54) INTEGRATED STRUT SUPPORT FITTINGS WITH UNDERWING LONGERONS

(71) Applicant: The Boeing Company, Chicago, IL (US)

(72) Inventor: Steven Paul Walker, Arlington, WA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 15/351,696

(22) Filed: Nov. 15, 2016

(65) Prior Publication Data
US 2018/0134399 A1    May 17, 2018

(51) Int. Cl.
*B64D 27/18* (2006.01)
*B64C 3/18* (2006.01)
(Continued)

(52) U.S. Cl.
CPC .............. *B64D 27/18* (2013.01); *B64C 3/182* (2013.01); *B64D 27/26* (2013.01); *B64F 5/10* (2017.01);
(Continued)

(58) Field of Classification Search
CPC .............. B64D 27/26; B64D 2027/262; B64D 2027/264; B64D 27/18; B64C 3/182
(Continued)

(56) References Cited

U.S. PATENT DOCUMENTS 3,848,832 A * 11/1974 Stanley ................. B64D 27/18
  244/54
4,437,627 A *  3/1984 Moorehead ............ B64D 27/18
  244/110 B
(Continued)

FOREIGN PATENT DOCUMENTS

EP    0115914    8/1984
FR    2891247    3/2007
(Continued)

OTHER PUBLICATIONS

European Search Report dated Feb. 19, 2018, issued in co-pending European Patent Application No. 17198351.3
(Continued)

*Primary Examiner* — Richard R. Green
*Assistant Examiner* — Brady W Frazier
(74) *Attorney, Agent, or Firm* — Joseph M. Rolnicki; Evans & Dixon, L.L.C.

(57) ABSTRACT

A jet engine support structure includes an inboard support fitting that is configured to be operatively attached to the jet engine, an outboard support fitting that is configured to be operatively attached to the jet engine, an inboard longeron that is configured to be attached to the inboard support fitting and an exterior underside surface of an aircraft wing, an outboard longeron that is configured to be attached to the outboard support fitting and the exterior underside surface of the wing, and a drag brace fitting that is configured to be attached to the inboard longeron and the outboard longeron and operatively attached to the jet engine. These component
(Continued)

parts are employed in operatively attaching the jet engine to the aircraft wing. The same set of component parts is employed in operatively attaching the jet engine to either a left side or port side wing or to operatively attach a jet engine to a right side or starboard side wing. The construction of the longerons enable their attachment to the underside surface of the wing using fasteners already used in the wing construction.

20 Claims, 9 Drawing Sheets

(51) Int. Cl.
 *B64D 27/26* (2006.01)
 *B64D 29/02* (2006.01)
 *B64C 3/32* (2006.01)
 *B64F 5/10* (2017.01)
(52) U.S. Cl.
 CPC ............ *B64C 3/18* (2013.01); *B64C 3/32* (2013.01); *B64D 29/02* (2013.01); *B64D 2027/262* (2013.01)
(58) Field of Classification Search
 USPC .......................................... 244/54
 See application file for complete search history.

(56) References Cited

U.S. PATENT DOCUMENTS

| | | | | |
|---|---|---|---|---|
| 4,560,122 | A * | 12/1985 | Parkinson | B64D 27/18 244/54 |
| 4,917,331 | A * | 4/1990 | Hager | B64D 27/00 244/54 |
| 7,083,143 | B2 * | 8/2006 | Whitmer | B64D 27/18 244/54 |
| 9,248,921 | B2 * | 2/2016 | West | B64D 27/18 |
| 2005/0082423 | A1 | 4/2005 | Whitmer et al. | |
| 2014/0361121 | A1 * | 12/2014 | Cominsky | B64C 1/26 244/131 |
| 2015/0013142 | A1 | 1/2015 | West | |
| 2015/0251768 | A1 * | 9/2015 | Woolley | B64D 27/26 244/54 |
| 2016/0229545 | A1 | 8/2016 | Pautis | |

FOREIGN PATENT DOCUMENTS

| | | |
|---|---|---|
| WO | WO03074359 | 9/2003 |
| WO | 03/074359 | 12/2003 |

OTHER PUBLICATIONS

European examination report dated Jan. 28, 2019, issued in co-pending European Patent Application No. 17 198 351.3.

* cited by examiner

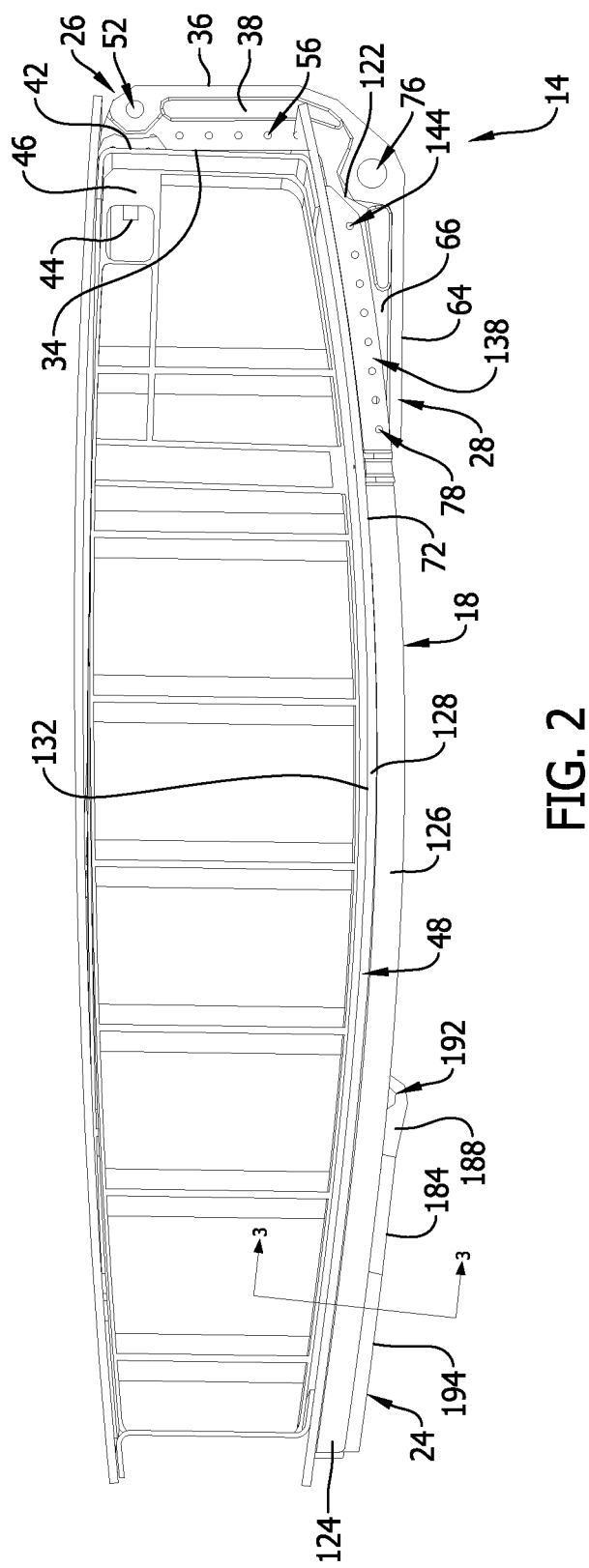
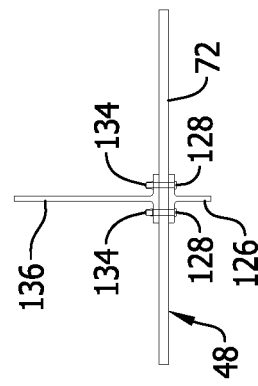

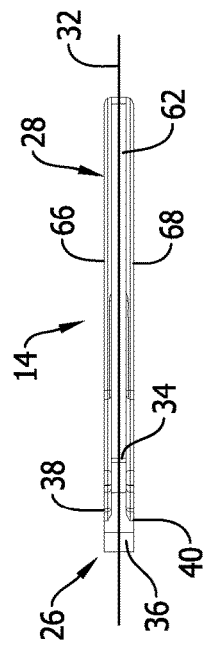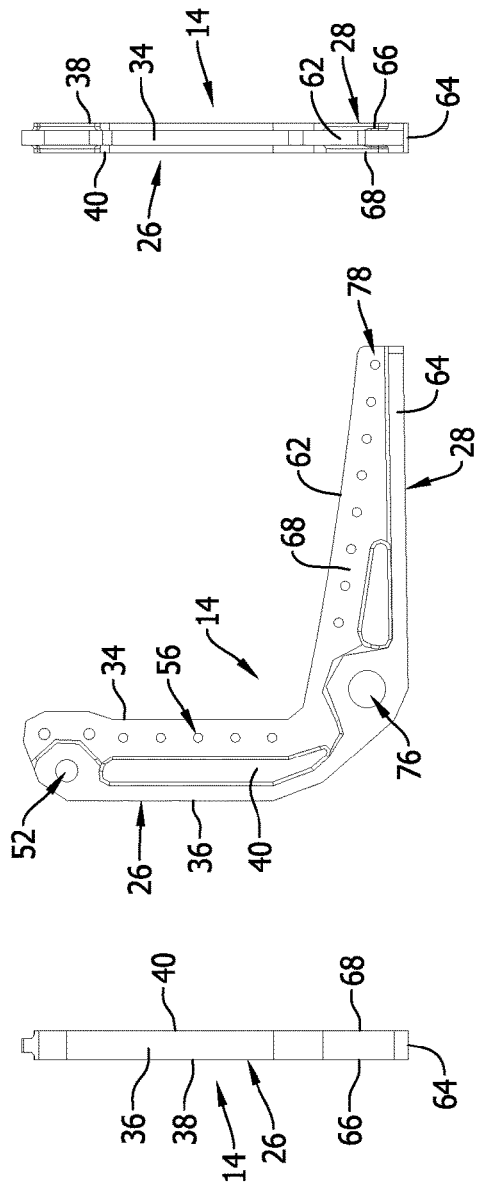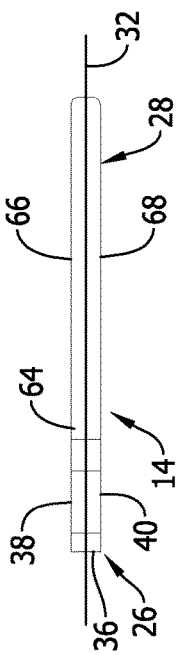

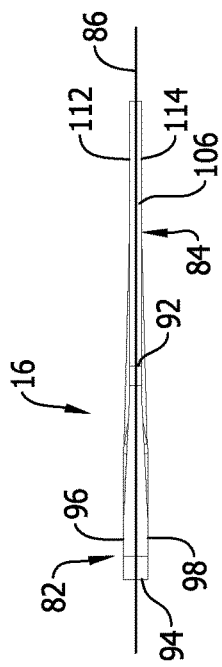
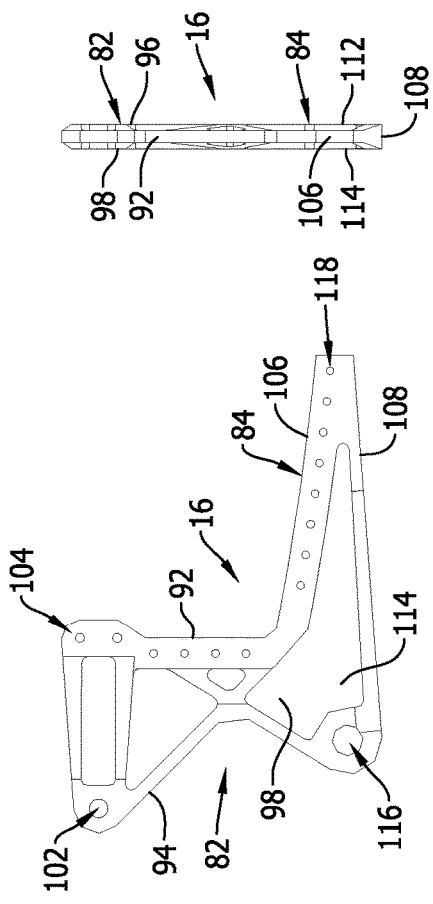
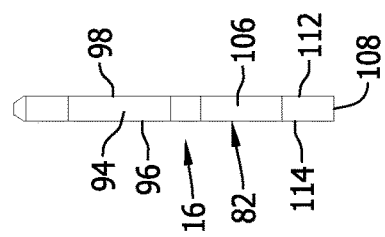
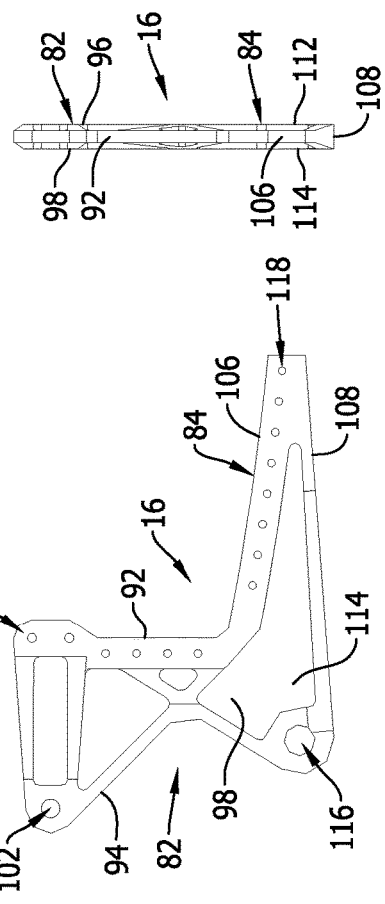
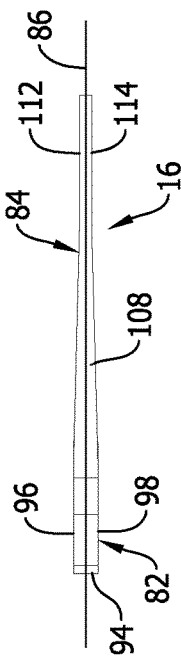

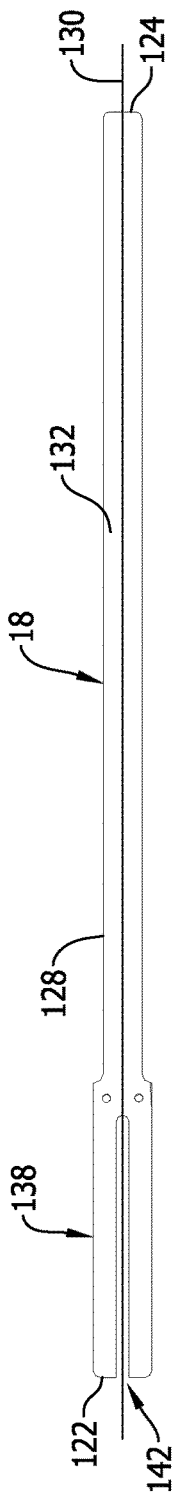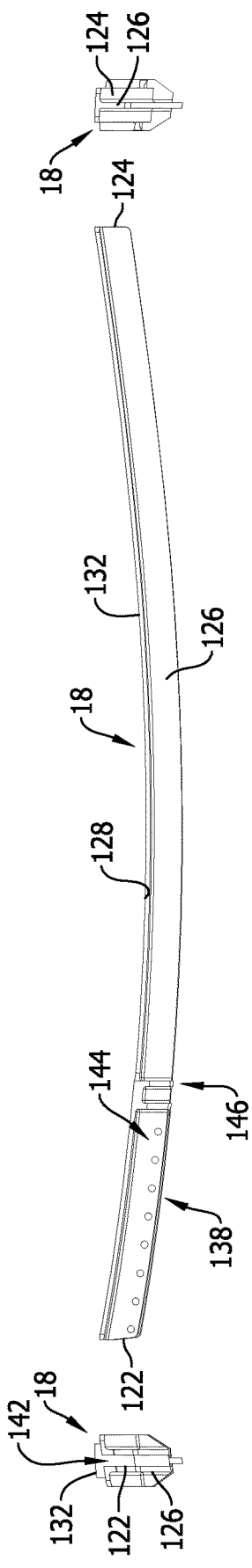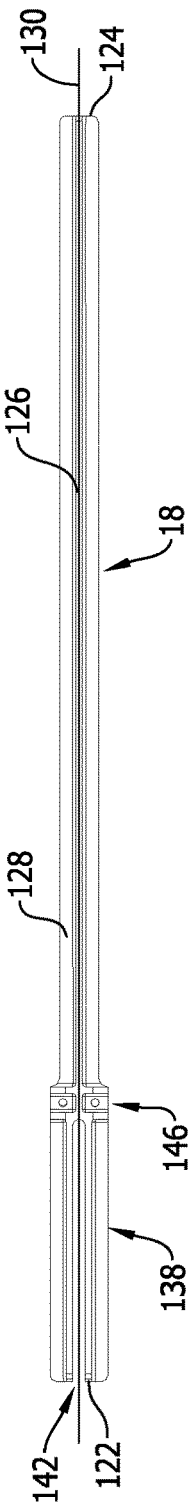

INTEGRATED STRUT SUPPORT FITTINGS WITH UNDERWING LONGERONS

FIELD

This disclosure pertains to a jet engine support structure. More specifically, this disclosure pertains to substantially identical jet engine support structures that are machined from metal, reducing their production cost. The support structures include integrated strut support fittings and underwing longerons that are employed in both operatively attaching a jet engine to a left side or port side aircraft wing and a jet engine to the right side or starboard side aircraft wing. The constructions of the longerons enable their attachment to the underside of an aircraft wing using fasteners already used in the wing construction, eliminating the need for additional fasteners.

BACKGROUND

Jet engine support fittings, also called strut or nacelle support fittings have grown in size and complexity owing to both increased regulatory requirements and the increasing size of jet engines. Jet engine support structures are designed to safely support a jet engine on an aircraft wing for a period of several years.

SUMMARY

The jet engine support structure of this disclosure is basically comprised of an inboard support fitting, an outboard support fitting, an inboard longeron, an outboard longeron and a drag brace fitting. These component parts are employed in operatively attaching a jet engine to an aircraft wing. The same set of component parts is employed in operatively attaching a jet engine to either a left side or port side wing or to operatively attach a jet engine to a right side or starboard side wing.

The inboard support fitting is constructed of machined metal, reducing its cost of manufacturing. The inboard support fitting has a front portion and a rear portion that are integral and have an angled configuration. The front portion of the inboard support fitting is configured to be operatively attached to a jet engine. An exterior surface configuration of the inboard support fitting is symmetric on opposite sides of a vertical plane that bisects the inboard support fitting. This enables the inboard support fitting to be employed on either of the aircraft wings on opposite sides of the aircraft. The front portion of the inboard support fitting is configured to be attached to a forward most spar of an aircraft wing. The rear portion of the inboard support fitting is configured to be attached to an underside exterior surface of the aircraft wing. Thus, the inboard support fitting does not enter into an interior wing box of the aircraft wing that typically contains a fuel cell.

The outboard support fitting is also constructed of machined metal, reducing its cost of manufacture. The outboard support fitting has a front portion and a rear portion that are integral and have an angled configuration. The front portion of the outboard support fitting is configured to be operatively attached to the jet engine. The exterior surface configuration of the outboard support fitting is symmetric on opposite sides of a vertical plane that bisects the outboard support fitting. This enables the outboard support fitting to be employed on either of the aircraft wings on opposite sides of the aircraft. The front portion of the outboard support fitting is configured to be attached to the forward most spar of the aircraft wing. The rear portion of the outboard support fitting is configured to be attached to the underside exterior surface of the aircraft wing. Thus, the outboard support fitting does not enter into the interior wing box of the aircraft wing that typically contains a fuel cell.

The inboard longeron has a length with opposite forward and rearward ends and a T-shaped cross-section configuration. The T-shaped cross-section configuration is defined by a center web that extends along the length of the inboard longeron and a flange at the top of the web that extends along the length of the inboard longeron. The flange projects outwardly from opposite sides of the web. The flange has a top surface that is configured to be attached to the underside exterior surface of the aircraft wing. Fasteners that are already used to attach a lower panel of the aircraft wing to a first rib inside the aircraft wing extend through the flange, through the wing panel and into a first rib inside the aircraft wing in attaching the inboard longeron to the wing. The forward end of the inboard longeron is split, defining a vertical slot in the forward end of the longeron. The vertical slot is dimensioned to receive the rear portion of the inboard support fitting. Fasteners extend through the forward end of the inboard longeron and the rear portion of the inboard support fitting in attaching the inboard support fitting to the inboard longeron.

The outboard longeron has a length with opposite forward and rearward ends and a T-shaped cross-section configuration. The T-shaped cross-section configuration is defined by a center web that extends along the length of the outboard longeron and a flange at the top of the web that extends along the length of the outboard longeron. The flange projects outwardly from opposite sides of the web. The flange has a top surface that is configured to be attached to the underside exterior surface of the aircraft wing. Fasteners that are already used to attach a lower panel of the aircraft wing to a second rib inside the aircraft wing extend through the flange, through the wing panel and into the second rib inside the aircraft wing in attaching the outboard longeron to the wing. The forward end of the outboard longeron is split, defining a vertical slot in the forward end of the longeron. The vertical slot is dimensioned to receive the rear portion of the outboard support fitting. Fasteners extend through the forward end of the outboard longeron and the rear portion of the outboard support fitting in attaching the outboard support fitting to the outboard longeron.

An important feature of the inboard and outboard longerons is that they are attached to the underside of the aircraft wing using fasteners that are already used in the wing construction. This eliminates the need for additional fasteners. Also, the inboard and outboard support fittings are attached across the forward most spar of the aircraft wing and the inboard and outboard longerons are attached across the underside of the wing lower panel. These attachments distribute loads created by the operation of the jet engine supported by the support structure around the wing.

The drag brace fitting is configured to be attached to the rearward end of the inboard longeron and the rearward end of the outboard longeron. The drag brace fitting is also configured to be operatively attached to the jet engine.

BRIEF DESCRIPTION OF THE DRAWINGS

Further features of the jet engine support structure are set forth in the following detailed description and in the drawing figures.

FIG. 2 is a representation of a side elevation view of the inboard support fitting, the inboard longeron, the drag brace fitting and a cross-section of an aircraft wing.

FIG. 3 is a representation of a cross-section view of portions of the inboard longeron and the aircraft wing of FIG. 2 in the plane of line 3-3 of FIG. 2.

FIG. 4 is a representation of a side elevation view of the opposite side of the inboard support fitting of FIG. 2 removed from the aircraft wing.

FIG. 5 is a representation of a top plan view of the inboard support fitting.

FIG. 6 is a representation of a bottom plan view of the inboard support fitting.

FIG. 7 is a representation of a front elevation view of the inboard support fitting.

FIG. 8 is a representation of a rear elevation view of the inboard support fitting.

FIG. 10 is a representation of a side elevation view of the outboard support fitting removed from the aircraft wing.

FIG. 11 is a representation of a top plan view of the outboard support fitting.

FIG. 12 is a representation of a bottom plan view of the outboard support fitting.

FIG. 13 is a representation of a front elevation view of the outboard support fitting.

FIG. 14 is a representation of a rear elevation view of the outboard support fitting.

FIG. 15 is a representation of a side elevation view of the inboard longeron.

FIG. 16 is a representation of a top plan view of the inboard longeron.

FIG. 17 is a representation of a bottom plan view of the inboard longeron.

FIG. 18 is a representation of a front elevation view of the inboard longeron.

FIG. 19 is a representation of a rear elevation view of the inboard longeron.

DETAILED DESCRIPTION

The jet engine support structure of this disclosure integrates support fittings with longerons and a drag brace fitting that are attached to the external surface of an aircraft wing lower panel. The integrated support fittings, longerons and drag brace fitting enable the jet engine support structure to be attached to the aircraft wing without requiring additional fasteners to those that are already employed in constructing the aircraft wing. Additionally, the integrated support fittings, longerons and drag brace fitting are attached around the wing in operatively attaching and supporting a jet engine on the wing and thereby distribute loads created by the operation of the jet engine around the wing.

Figure 25:
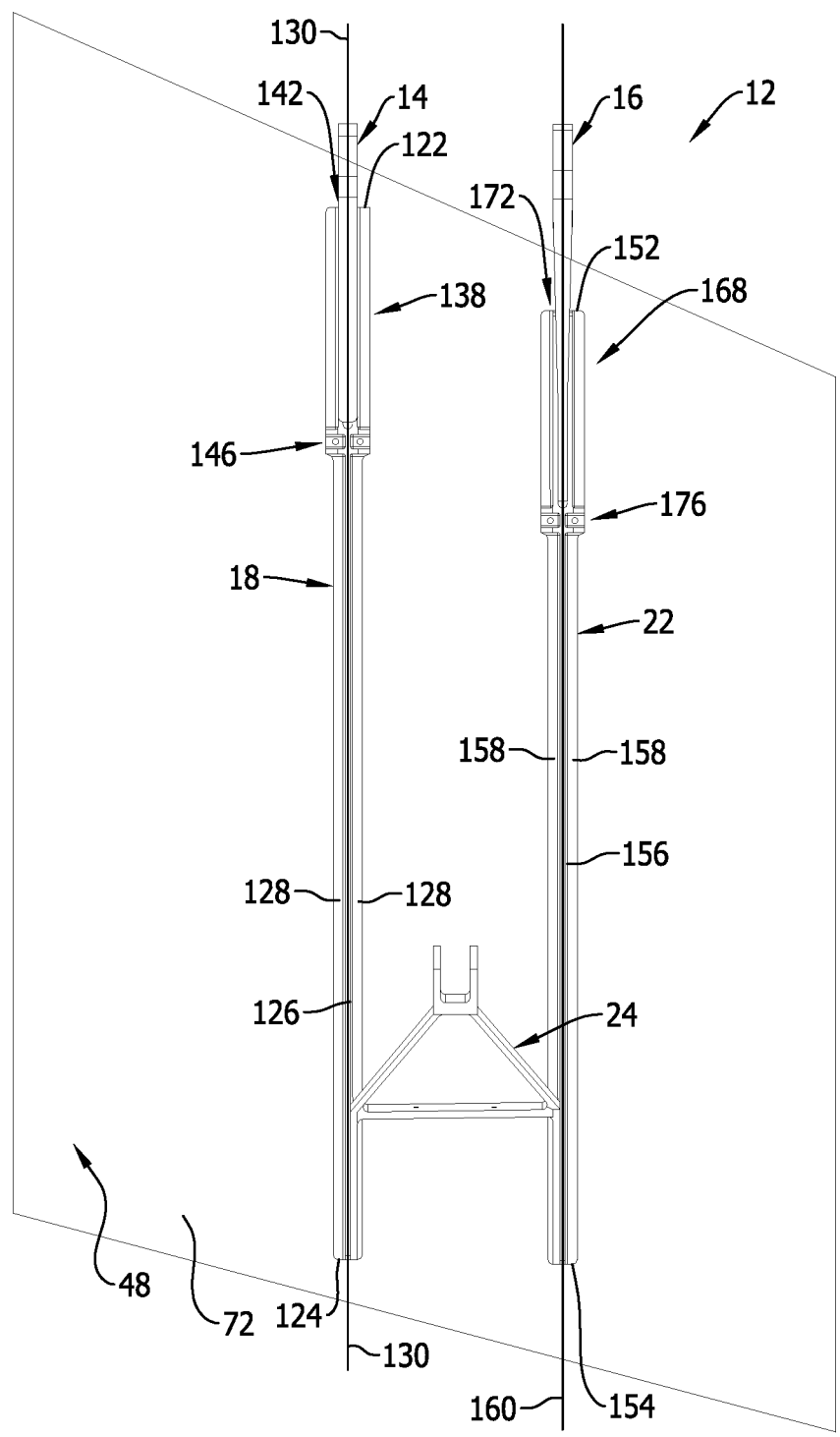
FIG. 25 is a representation of a bottom plan view of the inboard support fitting, the outboard support fitting, the inboard longeron, the outboard longeron and the drag brace fitting at their positions relative to a wing lower panel of an aircraft wing.

Referring to the drawing figures and in particular FIG. 25, the jet engine support structure 12 is basically comprised of an inboard support fitting 14, an outboard support fitting 16, an inboard longeron 18, an outboard longeron 22 and a drag brace fitting 24. Each of these component parts of the jet engine support structure 12 is constructed of metal, such as titanium, or another equivalent material.

FIGS. 2 and 4-8 show representations of the inboard support fitting 14. The inboard support fitting 14 is comprised of a front portion 26 and a rear portion 28 that together have an angled configuration. The front portion 26 and rear portion 28 are integral and are machined from a plate of metal, such as titanium. Machining the inboard support fitting 14 from a metal plate substantially reduces the cost of producing the inboard support fitting 14 compared to conventional support fittings that are die forged from metal. The front portion 26 and the rear portion 28 of the inboard support fitting 14 have exterior surface configurations that are symmetric on opposite sides of a center vertical plane 32 that bisects the inboard support fitting 14 as represented in FIGS. 5 and 6. This symmetric construction of the inboard support fitting 14 enables the inboard support fitting 14 to be employed in operatively attaching a jet engine to an aircraft wing on either the left, port side of an aircraft or the right, starboard side of the aircraft.

The front portion 26 of the inboard support fitting 14 has opposite rearward 34 and forward 36 surfaces. The front portion 26 also has a first side surface 38 and an opposite second side surface 40. The rearward surface 34 of the front portion 26 extends upwardly across the front surface of a forward most spar 42 of a wing of an aircraft when the inboard support fitting 14 is attached to the wing of the aircraft. This positioning of the inboard fitting 14 relative to the spar 42 is represented in FIG. 2. In FIG. 2 there is a representation of a tension fitting 44 attaching the front portion 26 of the inboard support fitting 14 through the forward most spar 42 of the aircraft wing and into a forward end of an interior rib 46 of the aircraft wing 48. In this manner, the inboard support fitting 14 is attached to the aircraft wing 48 without fasteners entering into the center void inside the aircraft wing behind the forward most spar 42 and between adjacent ribs of the aircraft wing interior that are often used to accommodate fuel cells of the aircraft.

Figure 1:
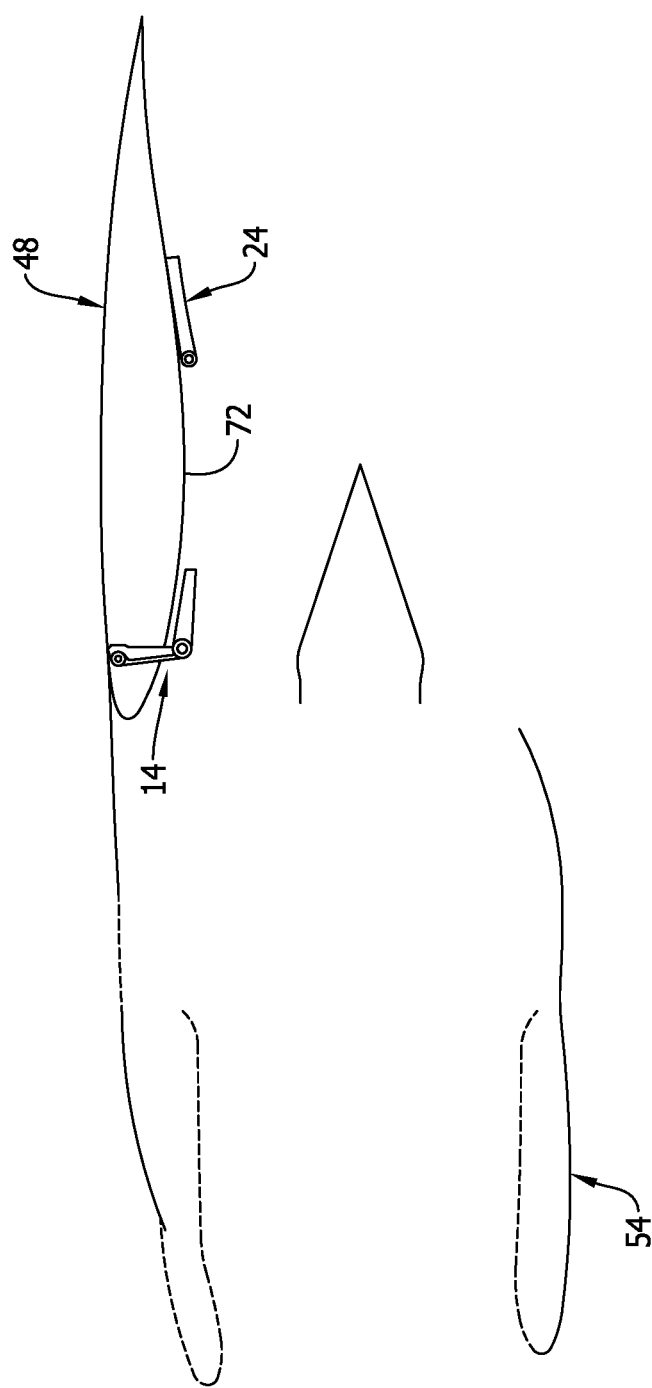
FIG. 1 is a representation of a side elevation view of a jet engine, a cross-section of an aircraft wing and a side elevation view of the inboard support fitting and the drag brace employed in operatively attaching the jet engine to the aircraft wing.

There is at least one fastener hole 52 through the front portion of the inboard support fitting between the rearward surface 34 and the forward surface 36 of the inboard fitting. The fastener hole 52 is configured to receive a fastener that operatively attaches the inboard fitting 14 to a jet engine 54 such as that represented in FIG. 1 of the aircraft. Additional fastener holes 56 are provided through the front portion of the inboard support fitting 14. These additional fastener holes 56 are employed in attaching the inboard support fitting 14 to the inboard longeron 18, as will be explained.

The rear portion 28 of the inboard support fitting 14 has opposite top 62 and bottom 64 surfaces. The rear portion 28 of the inboard fitting 14 also has opposite first 66 and second 68 side surfaces that are continuations of the respective first 38 and second 40 side surfaces of the front portion 34 of the inboard fitting 14. The top surface 62 of the rear portion 28 of the inboard fitting 14 extends across the exterior underside surface 72 of the wing lower panel 48 of the aircraft when the inboard fitting 14 is attached to the wing lower panel 48 in a manner to be explained. A fastener hole 76 extends through the rear portion 28 of the inboard fitting 14 between the top 62 and bottom 64 surfaces of the rear portion and adjacent the front portion 26 of the inboard fitting 14. The fastener hole 76 is, configured to receive a fastener that operatively attaches the inboard fitting 14 to the jet engine 54 of the aircraft such as that represented in FIG. 1. There are also additional fastener holes 78 through the rear portion 28 of the inboard fitting 14. These additional fastener holes 78 are used in attaching the inboard fitting 14 to the inboard longeron 18, as will be explained.

FIGS. 9-14 show representations of the outboard support fitting 16. The outboard support fitting 16 has a construction that is similar to that of the inboard support fitting 14. The outboard support fitting 16 is comprised of a front portion 82 and a rear portion 84 that together have an angled configuration. The front portion 82 and the rear portion 84 of the outboard support fitting 16 are integral and are machined from a plate of metal, such as titanium. As with the inboard support fitting 14, machining the outboard support fitting 16 from a plate of metal enables the support fitting to be produced at a substantially reduced cost than die forging the support fitting from metal. The front portion 82 and the rear portion 84 of the outboard support fitting 16 are also symmetric on opposite sides of a center vertical plane 86 that bisects the outboard support fitting 16 as represented in FIGS. 11 and 12. With the exterior surface configuration of the outboard support fitting 16 being symmetric on opposite sides of the vertical plane 86, the outboard support fitting 16 can be employed to operatively attach a jet engine to either the left or port side aircraft wing or to the right or starboard side aircraft wing.

Figure 9:
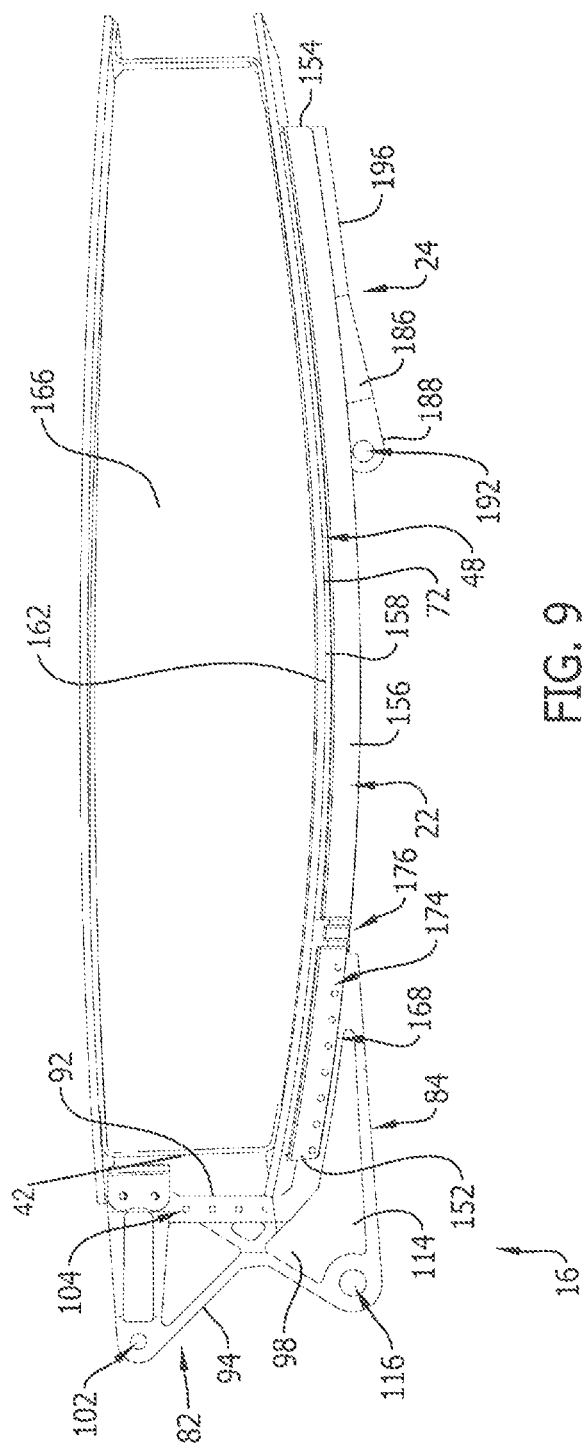
FIG. 9 is a representation of a side elevation view of the outboard support fitting, the outboard longeron, the drag brace fitting and a cross-section of an aircraft wing.
Figure 24:
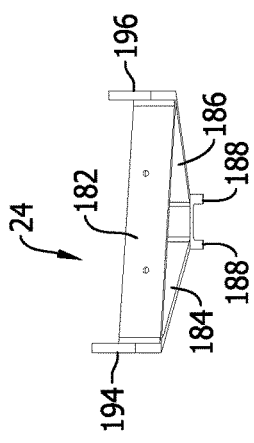
FIG. 24 is a representation of a rear elevation view of the drag brace fitting.
Figure 21:
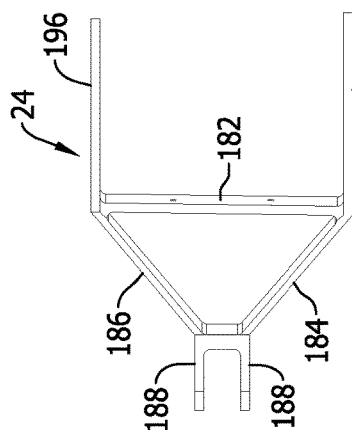
FIG. 21 is a representation of a top plan view of the drag brace fitting.
Figure 20:
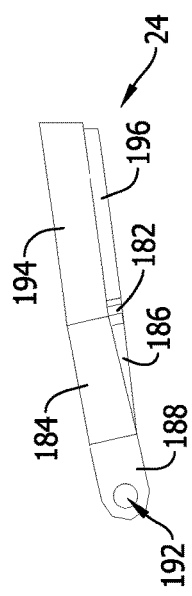
FIG. 20 is a representation of a side elevation view of the drag brace fitting.
Figure 22:
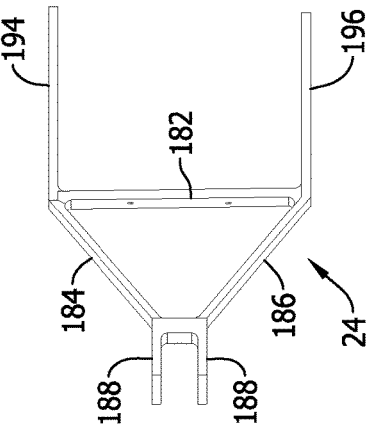
FIG. 22 is a representation of a bottom plan view of the drag brace fitting.
Figure 23:
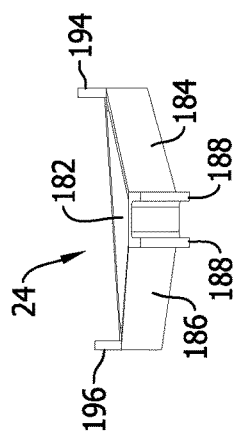
FIG. 23 is a representation of a front elevation view of the drag brace fitting.

The front portion 82 of the outboard support fitting 16 has opposite rearward 92 and forward 94 surfaces. The front portion 82 also has a first side surface 96 and an opposite second side surface 98. The rearward surface 92 of the front portion 82 extends upwardly across the front surface of the forward most spar 42 of a wing of an aircraft when the outboard support fitting 16 is attached to the wing. This positioning of the outboard support fitting 16 relative to the spar 42 is represented in FIG. 9. As with the inboard support fitting 14, the outboard support fitting 16 is attached to the wing lower panel 48 of the aircraft without fasteners extending into the center interior void of the wing that typically contains an internal fuel cell of the aircraft.

There is at least one fastener hole 102 though the front portion 82 of the outboard support fitting 16 between the rearward surface 92 and the forward surface 94 of the outboard fitting. The fastener hole 102 is configured to receive a fastener that operatively attaches the outboard fitting 16 to a jet engine 54 such as that represented in FIG. 1. Additional fastener holes 104 are provided through the front portion 82 of the outboard support fitting 16. These additional fastener holes 104 are employed in attaching the outboard support fitting 16 to the wing 48 of the aircraft.

The rear portion 84 of the outboard support fitting 16 has opposite top 106 and bottom 108 surfaces. The rear portion 84 of the outboard support fitting 16 also has opposite first 112 and second 114 side surfaces that are continuations of the respective first 96 and second 98 side surfaces of the front portion 82 of the outboard fitting 16. The top surface 106 of the rear portion 84 of the outboard fitting 16 extends across the exterior underside surface 72 of the wing lower panel 48 of the aircraft when the outboard fitting 16 is attached to the wing lower panel 48 in a manner to be explained. A fastener hole 116 extends through the rear portion 84 of the outboard fitting 16 between the top 106 and bottom 108 surfaces of the rear portion and adjacent the front portion 82 of the outboard fitting 16. The fastener hole 116 is configured to receive a fastener that operatively attaches the outboard fitting 16 to the jet engine 54 of the aircraft. There are also additional fastener holes 118 through the rear portion 84 of the outboard fitting 16. These additional fastener holes 118 are used in attaching the outboard fitting 16 to the outboard longeron 22, as will be explained.

FIGS. 15-19 show representations of the inboard longeron 18. The inboard longeron 18 has an elongate length between a forward end 122 of the longeron and a rearward end 124 of the longeron. The inboard longeron 18 has a substantially T-shaped cross-section configuration along the length of the inboard longeron. The T-shaped cross-section configuration of the inboard longeron 18 is defined by a vertical web 126 and a flange 128 at the top of the web 126. The flange 128 and the web 126 extend along the length of the longeron 18. The flange 128 projects out from the opposite sides of the top of the web 126 of the inboard longeron 18. The length of the inboard longeron 18 is symmetric on opposite sides of the center vertical plane 130 that extends through and bisects the inboard longeron 18 as represented in FIGS. 16 and 17. The flange 128 has a top surface 132 that is configured to engage against the exterior underside surface 72 of the aircraft wing lower panel 48 when the inboard longeron 18 is attached to the aircraft wing.

Referring to FIG. 3, when attaching the inboard longeron 18 to the aircraft wing, fasteners 134 that are used in construction of the wing lower panel 48 to an internal rib 136 of the wing are inserted through fastener holes spatially positioned along the length of the flange 128 on opposite sides of the web 126 of the inboard longeron 18, through the exterior underside surface 72 of the wing lower panel 48, and into a bottom flange of the internal rib 136 of the aircraft wing. Thus, the same fasteners 134 that are used in constructing the wing lower panel 48 to the first internal rib 136 of the wing are used in attaching the inboard longeron 18 to the wing. Additional fasteners are not needed in constructing the inboard longeron 18 to the aircraft wing. Additionally, the fasteners 134 that attach the inboard longeron 18 to the first internal rib 136 of the wing distribute loads created by operation of the jet engine operatively attached to the inboard longeron 18 along the length of the first internal rib 136 and the wing lower panel 48.

A forward portion 138 of the inboard longeron 18 adjacent the forward end 122 is split, defining a slot 142 inside the web 126 and inside the flange 128 at the forward portion 138. The slot 142 is dimensioned to receive the top of the rear portion 28 of the inboard support fitting 14. A plurality of fastener holes 144 extend through the web 126 of the inboard longeron 18 at the forward portion 138. The fastener holes 144 through the inboard longeron 18 align with the additional fastener holes 78 in the rear portion 28 of the inboard support fitting 14. A plurality of fasteners (not shown) are inserted through the aligned fastener holes 144 of the forward portion 138 of the inboard longeron 18 and the fastener holes 78 in the rear portion 28 of the inboard support fitting 14 and attach the inboard longeron 18 and the inboard fitting 14 together. Thus, the inboard support fitting 14 is attached to the lower panel 48 of the aircraft wing by the inboard longeron 18.

Pairs of gussets 146 extend between opposite sides of the web 126 and the underside of the flange 128 of the inboard longeron 18. The gussets are positioned rearwardly of the split forward portion 138 of the inboard longeron and reinforce the inboard longeron 18 adjacent the forward portion 138 that is connected by fasteners to the inboard fitting 14.

The outboard longeron 22 has a similar construction to the inboard longeron 18. However, due to the typical angled construction of an aircraft wing and the outboard longeron 22 being positioned outboard of the inboard longeron 18, the length of the outboard longeron 22 is shorter than that of the inboard longeron 18. This is represented in FIG. 25. The length of the outboard longeron 22 extends between a forward end 152 of the longeron and a rearward end 154 of the longeron. The outboard longeron 22 has a substantially T-shaped cross-section configuration along the length of the outboard longeron. The T-shaped cross-section configuration of the outboard longeron 22 is defined by a vertical web 156 and a flange 158 at the top of the web 156. The flange 158 and the web 156 extend along the length of the outboard longeron 22. The flange 158 projects out from opposite sides of the top of the web 156 of the outboard longeron 22. The length of the outboard longeron is symmetric on opposite sides of the center vertical plane 160 that extends through and bisects the outboard support fitting 16 as represented in FIG. 4. The flange 158 has a top surface 162 that is configured to engage against the exterior underside surface of the aircraft wing lower panel 48 when the outboard longeron 22 is attached to the aircraft wing.

When attaching the outboard longeron 22 to the aircraft wing, in a similar manner to that represented in FIG. 3, fasteners are inserted through fastener holes in the flange 158 on opposite sides of the web 156 of the outboard longeron 22, through the exterior underside surface 72 of the wing lower panel 48, and into a bottom flange of a second internal rib 166 of the aircraft wing. Thus, the same fasteners that are used in constructing the wing lower panel 48 to the second internal rib 166 of the wing are used in attaching the outboard longeron 22 to the wing. Additional fasteners are not needed in constructing the outboard longeron 22 to the aircraft wing. Additionally, the fasteners that attach the outboard longeron 22 to the second internal rib 166 of the wing distribute loads created by operation of the jet engine operatively attached to the outboard longeron 22 along the length of the second internal rib 166 and the wing lower panel 48.

A forward portion 168 of the outboard longeron 22 adjacent the forward end 152 is split, defining a slot 172 inside the web 156 and inside the flange 158 at the forward portion 168. The slot 172 is dimensioned to receive the top of the rear portion 84 of the outboard support fitting 16. A plurality of fastener holes 174 extend through the web 156 of the outboard longeron 22 at the forward portion 168. The fastener holes 174 through the outboard longeron 22 align with the additional fastener holes 118 through the rear portion 84 of the outboard support fitting 16. A plurality of fasteners (not shown) are inserted through the aligned fastener holes 174 of the forward portion 168 of the outboard longeron 22 and the fastener holes 118 in the rear portion 84 of the outboard support fitting 16 and attach the outboard longeron 22 and the outboard support fitting 16 together. Thus, the outboard support fitting 16 is attached to the lower panel 48 of the aircraft wing by the outboard longeron 22.

Pairs of gussets 176 extend between opposite sides of the web 156 and the underside of the flange 158 of the outboard longeron 22. The gussets are positioned rearwardly of the split forward portion 168 of the outboard longeron 22 and reinforce the outboard longeron 22 adjacent the forward portion 168 that is connected by fasteners to the outboard support fitting 16.

The drag brace fitting 24 operatively attaches the rearward portion of the jet engine 54 of the aircraft to rearward portions of the inboard longeron 18 and the outboard longeron 22. Referring to FIGS. 20-24, the drag brace fitting 24 has a center portion with a triangular configuration. The triangular configuration is defined by a base rail 182 having an elongate rectangular configuration that extends across the base of the triangular configuration, an inboard side rail 184 and an outboard side rail 186 that also have elongate rectangular configurations and define the opposite sides and the apex of the triangular configuration. A pair of spaced flanges 188 project outwardly from the apex of the triangular configuration. The flanges have axially aligned fastener holes 192 that are configured to attach the drag brace fitting 24 to the jet engine 54 of the aircraft. An inboard leg 194 and an outboard leg 196 project outwardly from the opposite ends of the base rail 182 of the drag brace fitting 24. The length dimension of the base rail 182 positions the inboard leg 194 and the outboard leg 196 against rearward portions of the respective inboard longeron 18 and outboard longeron 22. The inboard leg 194 and the outboard leg 196 are connected by fasteners to the respective inboard longeron 18 and outboard longeron 22 in attaching the drag brace fitting 24 to the longerons.

Figure 26:
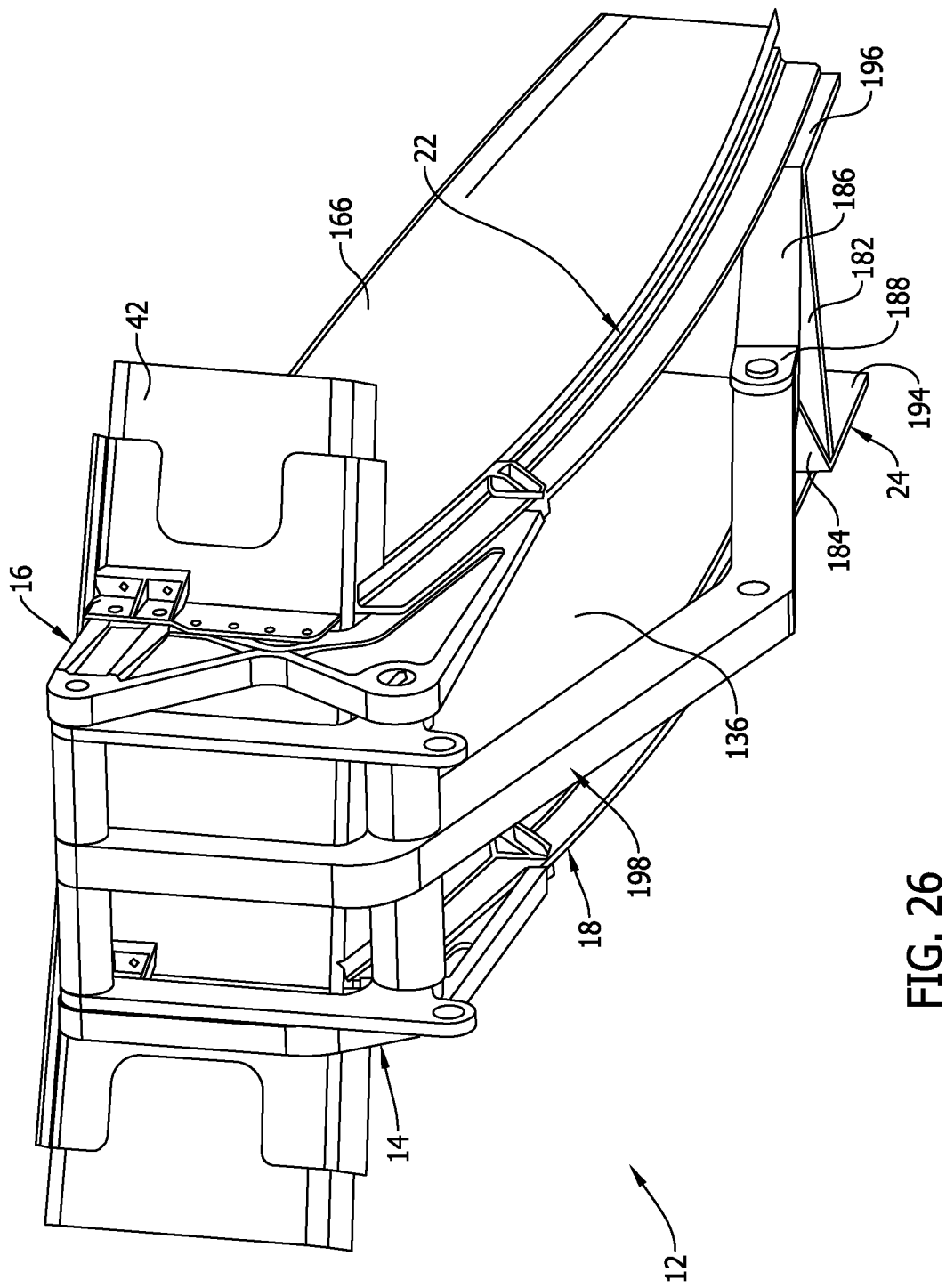
FIG. 26 is a representation of a perspective view of a specialized tool employed in attaching the inboard support fitting, the outboard support fitting, the inboard longeron, the outboard longeron and the drag brace fitting to the wing lower panel of an aircraft wing.

A specialized tool 198 represented in FIG. 26 is employed when attaching the inboard fitting 14, the outboard fitting 16, the inboard longeron 18, the outboard longeron 22 and the drag brace fitting 24 to an aircraft wing 48. The tool 198 enables the precise relative positioning of the inboard fitting 14, the outboard fitting 16, the inboard longeron 18, the outboard longeron 22 and the drag brace fitting 24 on the exterior underside surface 72 of the wing 48.

As various modifications could be made in the construction of the jet engine support structure 12 and its method of use herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A jet engine support structure comprising:
   an inboard support fitting that is configured to be attached to an aircraft wing and is configured to be operatively attached to a jet engine;
   an outboard support fitting that is configured to be attached to the aircraft wing and is configured to be operatively attached to the jet engine;
   an inboard longeron that is configured to be attached to the aircraft wing and is configured to be attached to the inboard support fitting;
   an outboard longeron that is configured to be attached to the aircraft wing and is configured to be attached to the outboard support fitting;
   the inboard support fitting and the inboard longeron are configured to be attached to a first rib inside the aircraft wing;
   the outboard support fitting and the outboard longeron are configured to be attached to a second rib inside the aircraft wing;

the inboard support fitting and the inboard longeron are configured to be attached to the first rib inside the aircraft wing by existing fasteners attaching a wing lower panel of the aircraft wing to the first rib inside the aircraft wing;

the outboard support fitting and the outboard longeron are configured to be attached to the second rib inside the aircraft wing by existing fasteners attaching the wing lower panel of the aircraft wing to the second rib inside the aircraft wing; and, the inboard support fitting having an exterior surface configuration that is symmetric on opposite sides of a vertical plane that bisects the inboard support fitting.

2. The jet engine support structure of claim 1, further comprising:

the outboard support fitting having an exterior surface configuration that is symmetric on opposite sides of a vertical plane that bisects the outboard support fitting.

3. A jet engine support structure comprising:

an inboard support fitting that is configured to be attached to an aircraft wing and is configured to be operatively attached to a jet engine;

an outboard support fitting that is configured to be attached to the aircraft wing and is configured to be operatively attached to the jet engine;

an inboard longeron that is configured to be attached to the aircraft wing and is configured to be attached to the inboard support fitting;

an outboard longeron that is configured to be attached to the aircraft wing and is configured to be attached to the outboard support fitting;

the inboard support fitting and the inboard longeron are configured to be attached to a first rib inside the aircraft wing;

the outboard support fitting and the outboard longeron are configured to be attached to a second rib inside the aircraft wing;

the inboard support fitting and the inboard longeron are configured to be attached to the first rib inside the aircraft wing by existing fasteners attaching a wing lower panel of the aircraft wing to the first rib inside the aircraft wing;

the outboard support fitting and the outboard longeron are configured to be attached to the second rib inside the aircraft wing by existing fasteners attaching the wing lower panel of the aircraft wing to the second rib inside the aircraft wing;

the inboard longeron being configured to attach to the first rib along a length of the first rib and distribute loads created by operation of the jet engine along the length of the first rib; and, the outboard longeron being configured to attach to the second rib along a length of the second rib and distribute loads created by operation of the jet engine along the length of the second rib.

4. The jet engine support structure of claim 3, further comprising:

the inboard support fitting being configured to be attached to a spar inside the aircraft wing that is outside a fuel cell inside the aircraft wing; and, the outboard support fitting being configured to be attached to the spar inside the aircraft wing that is outside the fuel cell inside the aircraft wing.

5. The jet engine support structure of claim 4, further comprising:

the spar in the aircraft wing being a forward most spar inside the aircraft wing.

6. The jet engine support structure of claim 3, further comprising:

the inboard longeron being configured to be attached to an exterior wing lower panel of the aircraft wing and distribute loads created by operation of the jet engine across the wing lower panel of the aircraft wing; and, the outboard longeron being configured to be attached to the exterior wing lower panel of the aircraft wing and distribute loads created by operation of the jet engine across the wing lower panel of the aircraft wing.

7. The jet engine support structure of claim 3, further comprising:

a drag brace fitting that is configured to be attached to the inboard longeron and attached to the outboard longeron and is configured to be operatively attached to the jet engine.

8. A jet engine support structure comprising:

an inboard support fitting having a front portion and a rear portion that are integral and have an angled configuration, the front portion being configured to be attached to a spar of an aircraft wing that is outside a fuel cell in the aircraft wing and the rear portion being configured to be attached to an exterior wing lower panel of the aircraft wing;

an outboard support fitting having a front portion and a rear portion that are integral and have an angled configuration, the front portion of the outboard support fitting being configured to be attached to the spar of the aircraft wing that is outside the fuel cell in the aircraft wing and the rear portion of the outboard support fitting being configured to be attached to the exterior wing lower panel of the aircraft wing;

an inboard longeron having a length with opposite forward and rearward ends and a T-shaped cross-section configuration defined by a center web that extends along the length of the inboard longeron and a flange on the web that extends along the length of the inboard longeron and projects outwardly from opposite sides of the web, the flange being configured to be attached to a first rib inside the aircraft wing;

an outboard longeron having a length with opposite forward and rearward ends and a T-shaped cross-section configuration defined by a center web that extends along the length of the outboard longeron and a flange on the web that extends along the length of the outboard longeron and projects outwardly from opposite sides of the web, the flange being configured to be attached to a second rib inside the aircraft wing;

the flange of the inboard longeron being configured to be attached to the first rib by existing fasteners that attach the wing lower panel to the first rib; and, the flange of the outboard longeron being configured to be attached to the second rib by existing fasteners that attach the wing lower panel to the second rib.

9. The jet engine support structure of claim 8, further comprising:

the inboard support fitting having an exterior surface configuration that is symmetric on opposite sides of a vertical plane that bisects the inboard support fitting.

10. The jet engine support structure of claim 9, further comprising:

the outboard support fitting having an exterior surface configuration that is symmetric on opposite sides of a vertical plane that bisects the outboard support fitting.

11. The jet engine support structure of claim 10, further comprising:
- the inboard longeron being configured to attach to the first rib along a length of the first rib and distribute loads created by operation of the jet engine along the length of the first rib; and,
- the outboard longeron being configured to attach to the second rib along a length of the second rib and distribute loads created by operation of the jet engine along the length of the second rib.

12. The jet engine support structure of claim 8, further comprising:
- the front portion of the inboard support fitting being configured to be attached to a forward most spar inside the aircraft wing; and,
- the front portion of the outboard support fitting being configured to be attached to the forward most spar inside the aircraft wing.

13. The jet engine support structure of claim 8, further comprising:
- the flange of the inboard longeron being configured to be attached to the first rib inside the aircraft wing and distribute loads created by operation of the jet engine along a length of the first rib; and,
- the flange of the outboard longeron being configured to be attached to the second rib inside the aircraft wing and distribute loads created by operation of the jet engine along a length of the second rib.

14. A method of attaching a jet engine to an aircraft wing, the method comprising:
- attaching an inboard support fitting to a first rib of the aircraft wing and operatively attaching the inboard support fitting to the jet engine, the inboard support fitting having an exterior surface configuration that is symmetric on opposite sides of a plane that bisects the inboard support fitting;
- attaching an outboard support fitting to a second rib of the aircraft wing and operatively attaching the outboard support fitting to the jet engine, the outboard support fitting having an exterior surface configuration that is symmetric on opposite sides of a plane that bisects the outboard support fitting;
- attaching an inboard longeron to the first rib along a length of the first rib to distribute loads created by operation of the jet engine along the length of the first rib; and,
- attaching an outboard longeron to the second rib along a length of the second rib to distribute loads created by operation of the let engine along the length of the second rib.

15. The method of claim 14, further comprising:
- attaching the inboard support fitting to the first rib inside the aircraft wing; and,
- attaching the outboard support fitting to the second rib inside the aircraft wing.

16. The jet engine support structure of claim 3, further comprising:
- the outboard support fitting having an exterior surface configuration that is symmetric on opposite sides of a vertical plane that bisects the outboard support fitting.

17. The jet engine support structure of claim 1, further comprising:
- the inboard support fitting being configured to be attached to a spar inside the aircraft wing that is outside a fuel cell inside the aircraft wing; and,
- the outboard support fitting being configured to be attached to the spar inside the aircraft wing that is outside the fuel cell inside the aircraft wing.

18. The jet engine support structure of claim 1, further comprising:
- the spar in the aircraft wing being a forward most spar inside the aircraft wing.

19. The jet engine support structure of claim 1, further comprising:
- the inboard longeron being configured to be attached to an exterior wing lower panel of the aircraft wing and distribute loads created by operation of the jet engine across the wing lower panel of the aircraft wing; and,
- the outboard longeron being configured to be attached to the exterior wing lower panel of the aircraft wing and distribute loads created by operation of the jet engine across the exterior wing lower panel of the aircraft wing.

20. The jet engine support structure of claim 1, further comprising:
- a drag brace fitting that is configured to be attached to the inboard longeron and attached to the outboard longeron and is configured to be operatively attached to the jet engine.

* * * * *